(12) United States Patent
Cormican

(10) Patent No.: US 11,762,902 B2
(45) Date of Patent: Sep. 19, 2023

(54) PROVIDING A VIDEO PREVIEW OF SEARCH RESULTS

(71) Applicant: GOOGLE LLC, Mountain View, CA (US)

(72) Inventor: Neil Cormican, Menlo Park, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 16/627,977

(22) PCT Filed: Dec. 12, 2017

(86) PCT No.: PCT/US2017/065927
§ 371 (c)(1),
(2) Date: Dec. 31, 2019

(87) PCT Pub. No.: WO2019/117882
PCT Pub. Date: Jun. 20, 2019

(65) Prior Publication Data
US 2020/0301965 A1    Sep. 24, 2020

(51) Int. Cl.
*G06F 16/738* (2019.01)
*G06F 3/0485* (2022.01)
(Continued)

(52) U.S. Cl.
CPC ............ *G06F 16/738* (2019.01); *G06F 3/017* (2013.01); *G06F 3/0485* (2013.01);
(Continued)

(58) Field of Classification Search
CPC .... G06F 16/738; G06F 16/743; G06F 16/735; G06F 3/017; G06F 3/0485; G06F 3/048
See application file for complete search history.

(56) References Cited

U.S. PATENT DOCUMENTS 9,733,809 B1* 8/2017 Greene ................. G06F 3/0482
10,891,044 B1* 1/2021 Corsin .................. G06F 3/0485
(Continued)

FOREIGN PATENT DOCUMENTS

CN       1742484 A    3/2006
CN     102821247 A   12/2012
(Continued)

OTHER PUBLICATIONS

PCT International Search Report and Written Opinion for International Application No. PCT/US2017/065927 dated May 16, 2018, 13 pages.

(Continued)

*Primary Examiner* — Beau D Spratt
(74) *Attorney, Agent, or Firm* — Lowenstein Sandler LLP

(57) ABSTRACT

A client device may receive a plurality of search result items. Each search result item may correspond to a media content item. The client device may present a user interface, including a scrollable search result area presenting a subset of the plurality of search result items, and a focus area presenting a preview of a media content item content item corresponding to one of the plurality of search result items. The client device may receive a user gesture in the scrollable search result area and in response, may determine whether the user gesture indicates a user interest in a second media content item. The client device may present a preview of the second media content item corresponding to the second search result item.

17 Claims, 9 Drawing Sheets

(51) Int. Cl.
  *G06F 16/74* (2019.01)
  *G06F 16/735* (2019.01)
  *G06F 3/01* (2006.01)
  *G06F 3/04883* (2022.01)

(52) U.S. Cl.
  CPC ........ *G06F 3/04883* (2013.01); *G06F 16/735* (2019.01); *G06F 16/743* (2019.01)

(56) References Cited

U.S. PATENT DOCUMENTS

| | | |
|---|---|---|
| 2002/0135621 A1 | 9/2002 | Angiulo et al. |
| 2004/0025180 A1* | 2/2004 | Begeja ................ G06F 16/7844 725/46 |
| 2006/0294476 A1 | 12/2006 | Buckley |
| 2007/0130602 A1* | 6/2007 | Gulli ................... H04N 21/812 725/113 |
| 2007/0198476 A1* | 8/2007 | Farago ................ G06F 16/9577 |
| 2008/0154889 A1* | 6/2008 | Pfeiffer ................ G06F 16/738 |
| 2009/0150784 A1* | 6/2009 | Denney .................. G11B 27/34 715/722 |
| 2010/0095239 A1 | 4/2010 | McCommons et al. |
| 2012/0144343 A1* | 6/2012 | Tseng .................... G06F 3/0482 715/834 |
| 2012/0278725 A1* | 11/2012 | Gordon ................ H04N 21/858 715/738 |
| 2013/0057489 A1* | 3/2013 | Morton ................. G06F 1/1694 345/173 |
| 2013/0176415 A1* | 7/2013 | Kim .................. H04N 21/4821 348/78 |
| 2013/0326583 A1* | 12/2013 | Freihold ................. G06F 1/166 726/3 |
| 2014/0139471 A1* | 5/2014 | Matsuki .................. G06F 3/041 345/173 |
| 2015/0113407 A1* | 4/2015 | Hoffert ............... H04N 21/482 715/720 |
| 2015/0310896 A1* | 10/2015 | Bredow ............... G11B 27/031 386/230 |
| 2016/0085814 A1 | 3/2016 | Fukuda |
| 2016/0104078 A1* | 4/2016 | Jorges .................... G06Q 10/02 705/5 |
| 2016/0349936 A1* | 12/2016 | Cho ........................ G06F 3/0481 |
| 2017/0357398 A1* | 12/2017 | Alonso-Ruiz ......... G06F 3/0484 |
| 2018/0095656 A1* | 4/2018 | Ingah ............... H04N 21/43615 |
| 2018/0113579 A1* | 4/2018 | Johnston ............ H04N 21/4622 |

FOREIGN PATENT DOCUMENTS

| | | |
|---|---|---|
| CN | 103164152 A | 6/2013 |
| CN | 103534701 A | 1/2014 |
| CN | 104660633 A | 5/2015 |
| CN | 105122242 A | 12/2015 |
| CN | 105426069 A | 3/2016 |
| CN | 106162378 A | 11/2016 |
| CN | 106462630 A | 2/2017 |
| CN | 106503029 A | 3/2017 |
| JP | 2010157156 A | 7/2010 |
| WO | 20060127480 | 3/2016 |

OTHER PUBLICATIONS

PCT Written Opinion of the International Preliminary Examining Authority for International Application No. PCT/US2017/065927 dated Mar. 3, 2020, 7 pages.

Office Action for Indian Patent Application No. 202248005620 dated Jun. 2, 2022, 6 pages.

Office Action for China Patent Application No. 201780091615.1 dated Dec. 1, 2022, 16 pages.

Yi Lin et al., " User Experience Design of VR-AR Hybrid Mobile Browsing System Based on Mental Model," Chinese Journal of Computers, Feb. 28, 2015, 15 pgs.

Marco A. Hudelist et al., "Mobile video browsing with a 3D filmstrip," ResearchGate, Apr. 30, 2013, 3 pgs.

\* cited by examiner

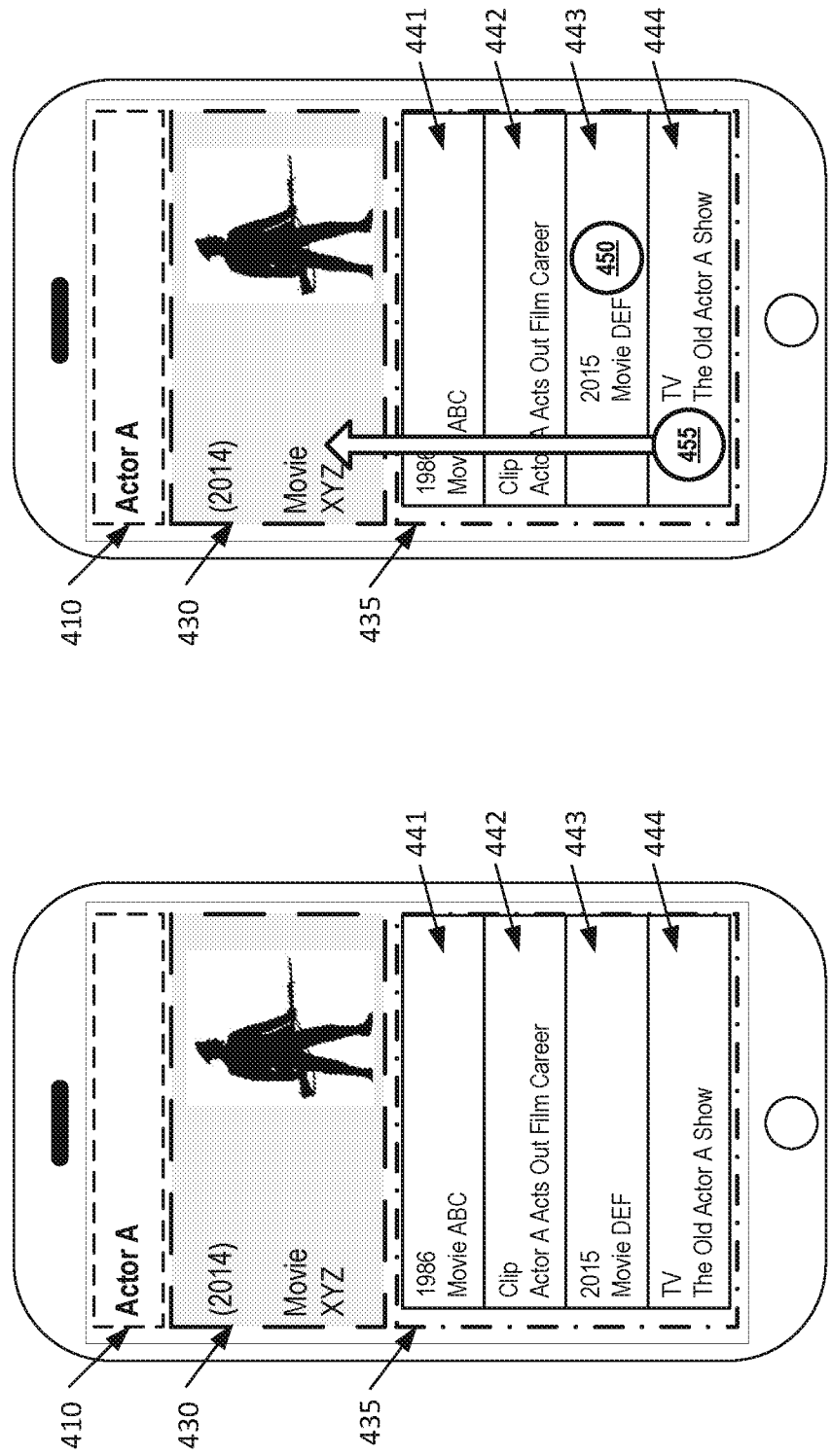

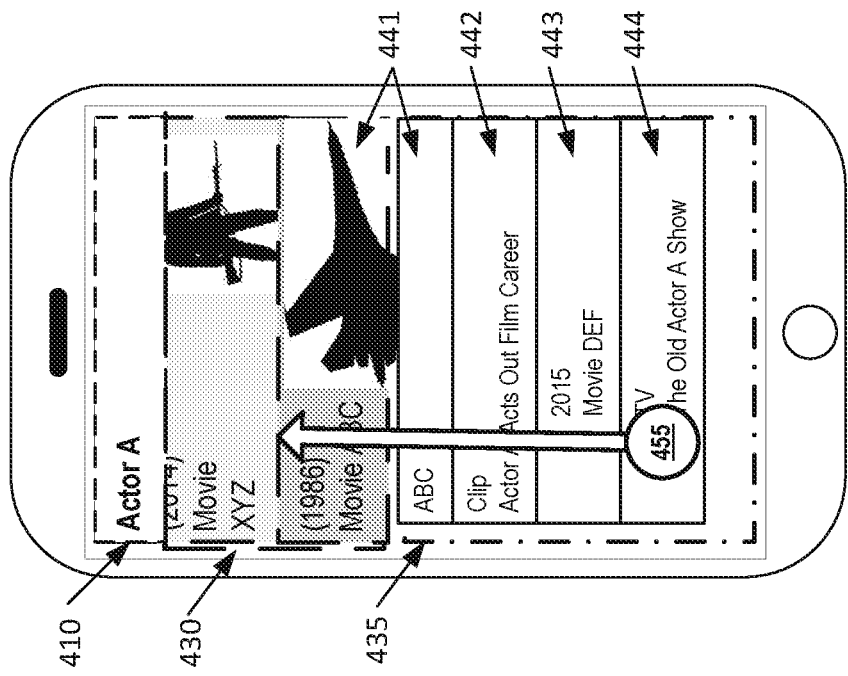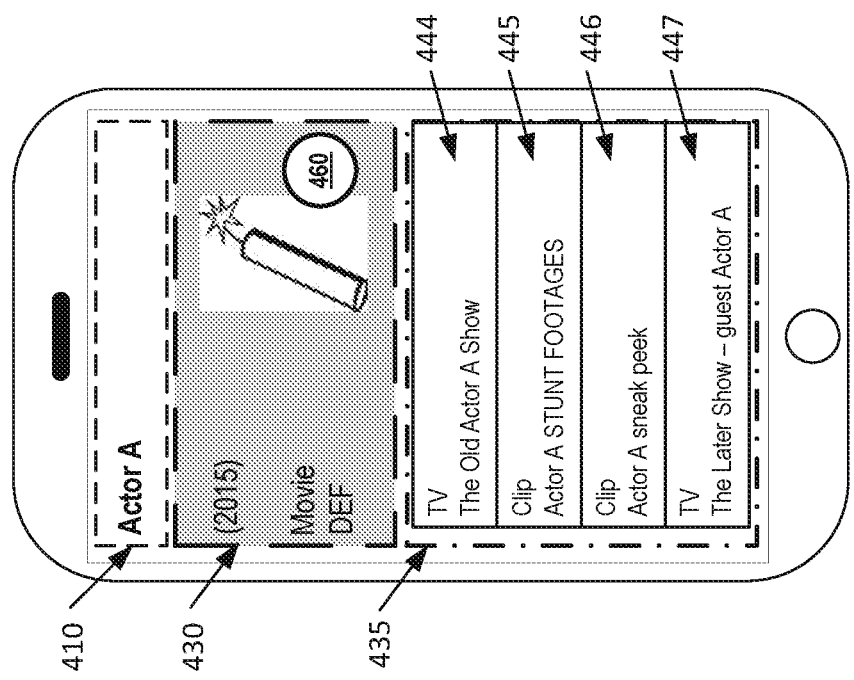

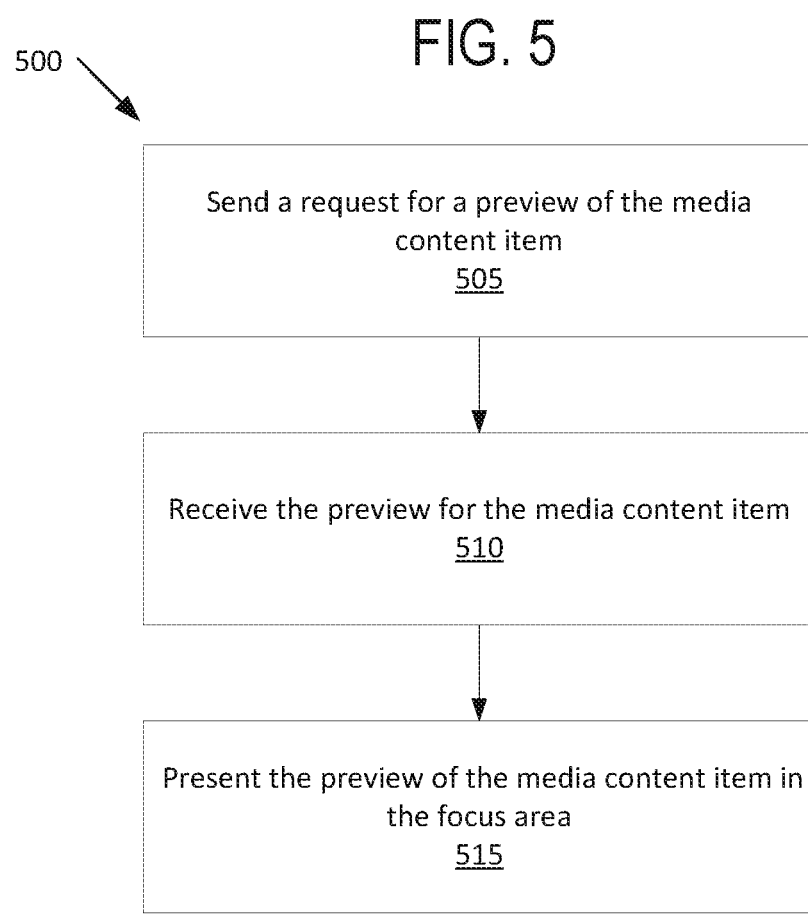

PROVIDING A VIDEO PREVIEW OF SEARCH RESULTS

TECHNICAL FIELD

This disclosure relates to the field of video content and, in particular, to determining a user interest in a media content item corresponding to one of multiple search results and providing a preview of the media content item while presenting the search results.

BACKGROUND

When searching for media content items, a user is provided with a list of search results that represent a list of potential media content items of interest. The list of search results may identify the corresponding media content items to the user. In order for the user to determine whether a particular media content item from the list of search result is what the user is looking for, the user may need to select the media content item and watch it. However, if the media content item is not the media content item that the user wished to view, the user will then have to go back to the provided list of search results to select another media content item from the list of search results.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Implementations of the disclosure may include a method, for example a computer-implemented method, to receive, at a client device, a plurality of search result items. Each of the search result items corresponds to a media content item, for example each of the search result items corresponds to a different media content item. The method may further present, for example on the client device, a user interface that includes a scrollable search result area to present a subset of the plurality of search result items, and a focus area to present a preview of a media content item corresponding to one of the plurality of search result items. The client device may receive a user input, for example a user gesture in the scrollable search result area. In response to receiving the user gesture, the client device may determine whether the user gesture indicates a user selection of a second search result item of the plurality of search result items (and hence indicates a user interest in a second media content item corresponding to the second search result item of the plurality of search result items). Further, in response to determining that the user gesture indicates a user selection of a second search result item (and so indicates a user interest in the second media content item), the client device may present a preview of the second media content item corresponding to the second search result item.

Another implementation of the disclosure includes a method, for example a computer-implemented method, to receive, at a client device a plurality of search result items that each correspond to a media content item; presenting a user interface comprising a scrollable search result area to present a subset of the plurality of search result items, and a focus area to present a preview of a media content item corresponding to one of the plurality of search result items; receiving, at the client device, a user gesture in the scrollable search result area; responsive to receiving the user gesture, determining whether the user gesture indicates a user interest in a second media content item corresponding to a second search result item of the plurality of search result items; and in response to determining that the user gesture indicates the user interest in the second media content item corresponding to the second search result, presenting a preview of the second media content item corresponding to the second search result item.

In some embodiments, the determination that the user gesture indicates the user's interest in the second media content item corresponding to the second search result item may be based on previously received user gestures associated with the user.

In some embodiments, the user gesture received in the scrollable search result area is a tap gesture on the second search result item. In some embodiments, the user gesture received in the scrollable search result area is a swipe gesture which causes the subset of the plurality of search result items to shift vertically upwards and causes the second search result item to be located within the focus area.

In some embodiments, presentation of the preview of the second media content item corresponding to the second search result item includes sending a request for the second media content item corresponding to the second search result item, receiving the second media content item corresponding to the second search result item and presenting, on the client device, the second media content item corresponding to the second search result item in the focus area.

In some embodiments, the second media content item may be one of a video trailer describing a video represented by the second media content item, a video clip comprising a subsection of the video, or the video.

In some embodiments, the type of second media content item presented by the client device is based upon previously presented media content items and user interactions with the previously presented media content items.

In some embodiments, prior to presenting the second media content item corresponding to the second search result item, the client device presents a thumbnail associated with the second media content item corresponding to the second search result item in the focus area.

In some embodiments, each search result item of the plurality of search result items includes metadata describing a corresponding media content item.

In some embodiments, presentation of the preview of the second media content item corresponding to the second search result item includes overlaying the preview of the second media content item in the focus area with the metadata describing the second media content item.

In some embodiments, a system may include a memory and a processing device coupled to the memory. The processing device may be configured to receive a plurality of search result items. Each of the search result items corresponds to a media content item. The processing device may be further configured to present a user interface that includes a scrollable search result area to present a subset of the plurality of search result items, and a focus area to present a preview of a media content item corresponding to one of the plurality of search result items. The processing device may receive a user gesture in the scrollable search result area. In response to receiving the user gesture, the processing device may determine whether the user gesture indicates a user interest in a second media content item corresponding to a second search result item of the plurality of search result items. Further, in response to determining that the user gesture indicates a user interest in the second media content item, the processing device may present a preview of the second media content item corresponding to the second search result item.

In some embodiments a machine-readable storage medium (which may be non-transitory machine-readable storage medium, although the invention is not limited to that) stores instructions which, when executed, cause a processing device to perform operations comprising a method according to any embodiment or aspect described herein.

In some embodiments a system comprises: a memory; and a processing device operatively coupled with the memory to perform operations comprising a method according to any embodiment or aspect described herein.

Embodiments of the present disclosure can provide the technical effect that the number of user selections and reselections of media content items associated with search results is reduced. This reduces computing resources and network bandwidth that are required because unnecessary downloading/streaming to the user's device of content media items that are not of interest to the user is eliminated.

BRIEF DESCRIPTION OF THE DRAWINGS

The present disclosure is illustrated by way of example, and not by way of limitation, in the figures of the accompanying drawings.

FIG. 4C illustrates an example graphical user interface providing search result items and a preview of a media content item in accordance with some aspects of the present disclosure.

FIG. 4D illustrates an example graphical user interface providing search result items and a preview of a media content item corresponding to one of the search result items, and illustrating user gestures in accordance with some aspects of the present disclosure.

FIG. 4E illustrates an example graphical user interface providing search result items and a preview of a second media content item corresponding to one of the search result items, in accordance with some aspects of the present disclosure.

FIG. 4F illustrates an example graphical user interface providing search result items and a preview of two media content items simultaneously in accordance with some aspects of the present disclosure.

FIG. 5 is a flow diagram of an example method to provide a preview of a media content item for presentation within a focus area in accordance with some aspects of the disclosure.

DETAILED DESCRIPTION

Figure 1:
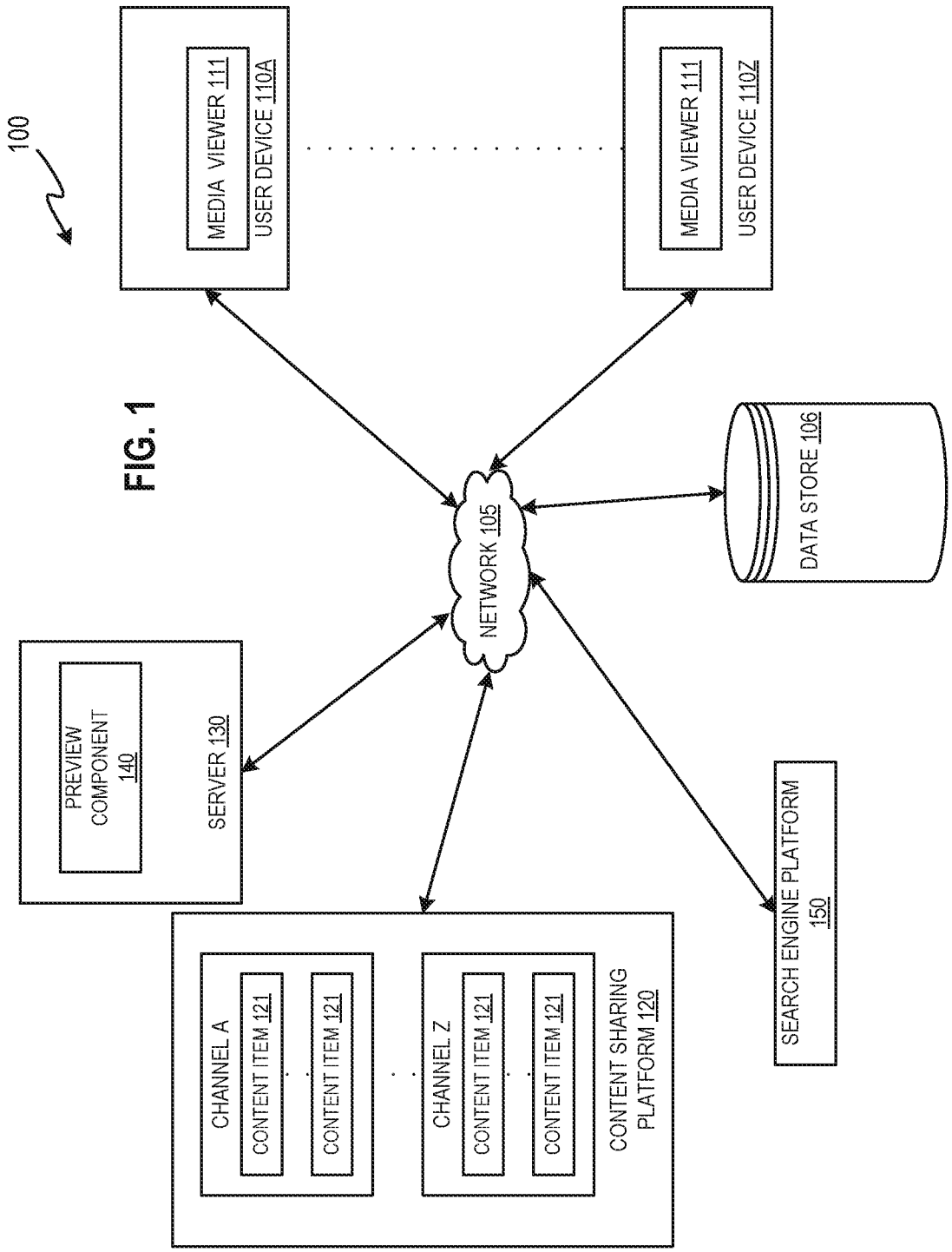
FIG. 1 illustrates an example system architecture in which embodiments of the present disclosure may operate.

Aspects of the present disclosure relate to presenting a preview of a media content item associated with a search result item from a plurality of search result items received on a client device. The client device may include, but is not limited to, a personal computer, a tablet, a smartphone, or any other computing device. In general, a user of the client device may enter a search query to obtain specific media content items for viewing. The client device may send the search query to a search engine platform configured to search a data store of a content sharing platform for media content items related to the search query. For example, the user of the client device may initiate a search for videos of a famous Hollywood actor by submitting a search query including the name of the actor. The client device may then send the search query to the search engine platform to search for the related media content items maintained on the content sharing platform.

In response to receiving the search query from the client device, the search engine platform may perform a search based on the search query, and send, to the client device, a resulting set of search result items that correspond to a plurality of media content items related to the search query. For instance, the set of search result items may correspond to the media content items related to the famous actor.

The client device, upon receiving the set of search result items, may then display the set of search result items within a user interface on a display unit of the client device. The search result items may display descriptive text or images that illustrate their corresponding media content items. The user may then select a specific search result item and view the corresponding media content item. For example, a specific search result item, from the set of search result items, may display descriptive text or images indicating that the corresponding media content item is a movie starring Actor A, such as Movie XYZ. If the user wishes to view the movie XYZ, then the user may select the specific search result item, which then initiates a request to play the corresponding media content item, which in this example is the movie XYZ. However, if the corresponding media content item is not the movie XYZ or is not what the user intended to view, then the user would have to return to the list of search results (typically in a different user interface) in order to select a different search result item. The process of selecting and playing media content items corresponding to different search result items may result in the user having to repeatedly select and reselect different search result items (and typically also switch between different user interfaces) until the desired search result item and a corresponding media content item is found.

One of the reasons a user may repeatedly select and reselect different search result items until the desired media content item is found is that a user's selection is usually based upon the description of the corresponding media content item within the search result item. For example, if a specific search result item displays text such as, "Movie XYZ, a classic 80's action movie," the user may expect to watch the movie XYZ itself when the search result item is selected. However, the description within the search result item may correspond to a video of critics discussing the merits of the movie XYZ, rather than the movie itself. The descriptive text and/or representative images displayed within each search result item may not provide the user with enough information about the corresponding media content item. As a result, the user may end up repeatedly selecting and reselecting multiple search result items and switching between different views or user interfaces until the desired media content item is chosen. This may be especially cumbersome for search queries that return numerous (e.g., more than 50) search results that need to be presented on a small-size screen of a mobile device.

Aspects of the present disclosure address the above and other deficiencies by providing a user interface including a focus area and a scrollable search area. The focus area may be configured to present a preview of a media content item corresponding to a specific search result item that the user has indicated an interest in viewing. For example, the user may indicate, using a particular gesture, an interest in a specific search result item describing the movie XYZ. The client device may then be configured to present a preview of the corresponding media content item within the focus area, while the scrollable search area continues to display the other search result items. Based on the preview, the user may verify that the media content item featured in the preview is what the user would like to watch, and may select the media content item for playback. Alternatively, if the user decides that the media content item featured in the preview is not what the user would like to watch, the user may continue reviewing the search results, and may indicate, using a particular gesture, an interest in another media content item associated with a different search result item. In response, the other media content item may appear in the preview area, and the user may be able to verify that the other media content item featured in the preview is what the user would like to watch. As such, the user is able to scroll through the search result items in one area of the UI while also viewing previews of some of the media content item that correspond to the search result items in another area of the UI, thereby providing more information about potentially interesting media content items in the same UI as the scrollable list of the search result items and without having to navigate between different views or UIs.

In some implementations, detecting an indication of a user interest in a media content item associated with a particular search result item from the scrollable list may involve detecting a predefined user gesture with respect to the particular search result item. For example, if the user taps or otherwise selects a specific search result item, then the client device may present a preview of the corresponding media content item within the focus area. If the user swipes in a specific direction causing one of the search result items to shift its location into the focus area, reach the focus area or be located within at least a predetermined distance from the focus area, then the client device may initiate a preview of the media content item corresponding to the shifted search result item in the focus area. Additionally, the client device may determine user interest in a search result item based upon user input behavior matching particular input behavior from historical user inputs. For example, different types of user gestures (e.g., swipes or taps) previously used by the user with respect to search result items when scrolling through the list, and subsequent user behavior to select or not to select, for playback, media content items corresponding to those search result items may be used as training data for a machine learning model that can be trained to predict user interest in media content items associated with future search results.

In some implementations, different types of preview items can be presented within the focus area based upon the corresponding media content items or the user interactions with previously presented content. For example, if the corresponding media content item is a movie or other lengthy video, then the client device may present a video trailer or a video snippet of the corresponding media content item in the focus area. Alternatively, if the corresponding media content item is a short video clip, then the client device may present in the focus area a preview that is the actual media content item, rather than a trailer of the media content item. Additionally, the client device may use video preview and user gesture history to determine which type of preview the user prefers. For example, if previously the user cancelled or otherwise navigated away from previews that were trailers, then the client device may prefer to present video snippets or actual video previews of the media content items to the user instead of video trailers.

Accordingly, aspects of the present disclosure can accurately predict, or more accurately predict, user interest in certain search results and provide a preview of corresponding media content items in the UI that also a scrollable list of search results. As a result, the number of user selections and reselections of media content items associated with search results is reduced, which in turn reduces computing resources and improves network bandwidth because unnecessary downloading/streaming of media content items that are not of interest to the user is eliminated. In addition, this increases reliability of the content sharing platform especially when used with small-size mobile devices, and also makes the content-sharing platform easier to use.

FIG. 1 illustrates an example system architecture 100, in accordance with one implementation of the disclosure. The system architecture 100 includes client devices 110A through 110Z, a network 105, a data store 106, a content sharing platform 120, a server 130, and a search engine platform 150. In one implementation, network 105 may include a public network (e.g., the Internet), a private network (e.g., a local area network (LAN) or wide area network (WAN)), a wired network (e.g., Ethernet network), a wireless network (e.g., an 802.11 network or a Wi-Fi network), a cellular network (e.g., a Long Term Evolution (LTE) network), routers, hubs, switches, server computers, and/or a combination thereof. In one implementation, the data store 106 may be a memory (e.g., random access memory), a cache, a drive (e.g., a hard drive), a flash drive, a database system, or another type of component or device capable of storing data. The data store 106 may also include multiple storage components (e.g., multiple drives or multiple databases) that may also span multiple computing devices (e.g., multiple server computers).

The client devices 110A through 110Z may each include computing devices such as personal computers (PCs), laptops, mobile phones, smart phones, tablet computers, network connected televisions, netbook computers etc. In some implementations, client device 110A through 110Z may also be referred to as "user devices." Each client device includes a media viewer 111. In one implementation, the media viewers 111 may be applications that allow users to view content, such as images, videos (e.g., media content items and video previews of media content items), web pages, documents, etc. For example, the media viewer 111 may be a web browser that can access, retrieve, present, and/or navigate content (e.g., web pages such as Hyper Text Markup Language (HTML) pages, digital media items or content items, etc.) served by a web server. The media viewer 111 may render, display, and/or present the content (e.g., a web page, a media viewer) to a user. The media viewer 111 may also display an embedded media player (e.g., a Flash® player or an HTML5 player) that is embedded in a web page (e.g., a web page that may provide information about a product sold by an online merchant). In another example, the media viewer 111 may be a standalone application that allows users to view digital media content items (e.g., digital videos, digital images, electronic books, etc.).

The media viewers 111 may be provided to the client devices 110A through 110Z by the server 130 and/or content sharing platform 120. For example, the media viewers 111 may be embedded media players that are embedded in web pages provided by the content sharing platform 120. In another example, the media viewers 111 may be applications that communicate with the server 130.

In general, functions described in one implementation as being performed by the content sharing platform 120 can also be performed on the client devices 110A through 110Z in other implementations, if appropriate. In addition, the functionality attributed to a particular component can be performed by different or multiple components operating together. The content sharing platform 120 can also be accessed as a service provided to other systems or devices through appropriate application programming interfaces, and thus is not limited to use in websites.

In one implementation, the content sharing platform 120 may be one or more computing devices (such as a rackmount server, a router computer, a server computer, a personal computer, a mainframe computer, a laptop computer, a tablet computer, a network connected television, a desktop computer, etc.), data stores (e.g., hard disks, memories, databases), networks, software components, and/or hardware components that may be used to provide a user with access to media items (also referred to as content items) and/or provide the media items to the user. For example, the content sharing platform 120 may allow a user to consume, upload, search for, approve of ("like"), dislike, and/or comment on media items. The content sharing platform 120 may also include a website (e.g., a webpage) that may be used to provide a user with access to the media items.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user". In another example, an automated consumer may be an automated ingestion pipeline, such as a topic channel, of the content sharing platform 120.

The content sharing platform 120 may include multiple channels (e.g., channels A through Z). A channel can be data content available from a common source or data content having a common topic, theme, or substance. The data content can be digital content chosen by a user, digital content made available by a user, digital content uploaded by a user, digital content chosen by a content provider, digital content chosen by a broadcaster, etc. For example, a channel X can include videos Y and Z. A channel can be associated with an owner, who is a user that can perform actions on the channel. Different activities can be associated with the channel based on the owner's actions, such as the owner making digital content available on the channel, the owner selecting (e.g., liking) digital content associated with another channel, the owner commenting on digital content associated with another channel, etc. The activities associated with the channel can be collected into an activity feed for the channel. Users, other than the owner of the channel, can subscribe to one or more channels in which they are interested. The concept of "subscribing" may also be referred to as "liking", "following", "friending", and so on.

Once a user subscribes to a channel, the user can be presented with information from the channel's activity feed. If a user subscribes to multiple channels, the activity feed for each channel to which the user is subscribed can be combined into a syndicated activity feed. Information from the syndicated activity feed can be presented to the user. Channels may have their own feeds. For example, when navigating to a home page of a channel on the content sharing platform, feed items produced by that channel may be shown on the channel home page. Users may have a syndicated feed, which is a feed comprised of at least a subset of the content items from all of the channels to which the user is subscribed. Syndicated feeds may also include content items from channels that the user is not subscribed. For example, the content sharing platform 120 or other social networks may insert recommended content items into the user's syndicated feed, or may insert content items associated with a related connection of the user in the syndicated feed.

Each channel may include one or more media content items 121. Examples of a media content item 121 can include, and are not limited to, digital video, digital movies, digital photos, digital music, website content, social media updates, electronic books (ebooks), electronic magazines, digital newspapers, digital audio books, electronic journals, web blogs, real simple syndication (RSS) feeds, electronic comic books, software applications, etc. In some implementations, media content item 121 is also referred to as a video content item.

A media content item 121 may be consumed via the Internet and/or via a mobile device application. As used herein, "media", "media item," "online media item," "digital media," "digital media item," "content," "content item," and "video content item" can include an electronic file that can be executed or loaded using software, firmware or hardware configured to present the digital media item to an entity. In one implementation, the content sharing platform 120 may store the media content items 121 using the data store 106.

In one implementation, the search engine platform 150 may be one or more computing devices (e.g., a rackmount server, a server computer, etc.) configured to allow users to query for one or more content media items stored within the data store 106, the content sharing platform 120, and/or the server 130. In one implementation, query results sent to client devices may include a set of search result items that each correspond to media content items stored within the data store 106, the content sharing platform 120, and/or the server 130.

In one implementation, the server 130 may be one or more computing devices (e.g., a rackmount server, a server computer, etc.). The server 130 may be included in the content sharing platform 120 or be part of a different system. The server 130 may host a preview component 140 that is configured to store associations between different media content items and selected preview videos for the different media content items. For example, a media content item that is a movie may have multiple preview videos associated with media content items such as, a video trailer, multiple video snippets of the movie, and/or related summary videos that describe or discuss aspects of the movie. In one implementation, the preview videos for the media content items may be stored within the data store 106, the content sharing platform 120, and/or the server 130.

The preview component 140 may receive a search query from a user device 110, generate a list of media content items pertaining to the search query from the data store 106, and generate a user interface to present search result items corresponding to media content items from the list. In particular, the user interface may include a scrollable search area including the search result items and an area, referred to herein as the "focus area", that may present a preview of a media content item corresponding to a specific search result item that the user has indicated an interest in viewing. Based on the preview, the user may verify that the media content item featured in the preview is what the user would like to watch, and may request to watch the media content item featured in the preview (e.g., by selecting a play indicator or a similar UI element). In response, the preview component 140 streams or downloads the requested media content item to the user device 110.

If the user decides that the media content item featured in the preview is not what the user would like to watch, the user may continue reviewing the search results, and may indicate, using a particular gesture, an interest in another media content item associated with a different search result item. In response, the preview component 140 provides a preview of the other media content item to the user device 110 to cause the focus area of the UI to be updated with a preview of the other media content item.

In some implementations, the preview component 140 includes a training engine that trains a machine learning model using a training set reflecting different user actions with respect to search result items and associated media content items. The training agent may use previously inputted user gestures from the user and/or other users with respect to search result items as training inputs and user selections of corresponding media content items for playback as target outputs to train the machine learning model. The training agent may train a machine learning model for a specific user and provide the trained machine learning model to a user device of the respective user to use as discussed in more detail below.

Although implementations of the disclosure are discussed in terms of content sharing platforms and promoting social network sharing of a content item on the content sharing platform, implementations may also be generally applied to any type of social network providing connections between users. Implementations of the disclosure are not limited to content sharing platforms that provide channel subscriptions to users.

In situations in which the systems discussed here collect personal information about users, or may make use of personal information, the users may be provided with an opportunity to control whether the content sharing platform 120 collects user information (e.g., information about a user's social network, social actions or activities, profession, a user's preferences, a user's purchase transaction history, inputted user gestures, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by the content sharing platform 120.

Figure 2:
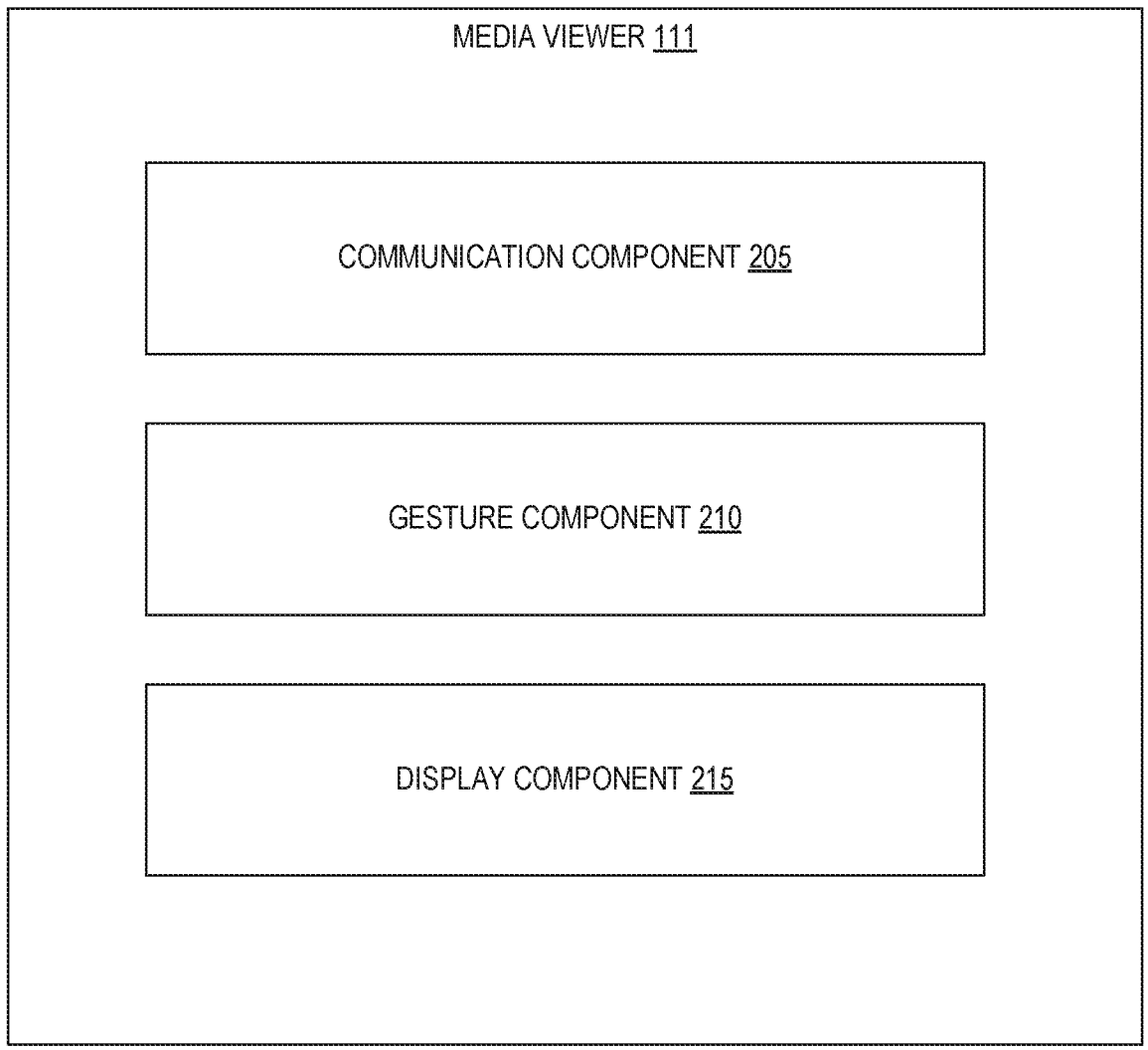
FIG. 2 illustrates an example media viewer that provides a preview of a media content item corresponding to a search result selected from a list of search results based on determined interest of a user, in accordance with some aspects of the disclosure.

FIG. 2 illustrates an example media viewer 111 of client devices 110A-110Z that provides a preview of a media content item corresponding to a search result selected from a list of search results based on determined interest of a user. Media viewer 111 may include a communication component 205, a gesture component 210, and a display component 215. In one implementation, the communication component 205 may be configured to communicate with the content sharing platform 120, the search engine platform 150, and the preview component 140 to request and receive search result items, preview videos, and content media items for display and viewing in a UI of the media viewer 111.

In one implementation, the gesture component 210 may be configured to identify, user inputs and determine different gestures for each user input. For example, the gesture component 210 may recognize a touch input, such as a user's finger as proximate, or in contact with, a touch-sensitive surface of a display (e.g., a touchscreen) of the client device 110A. The gesture component 210 may also be configured to associate different gestures from different users with different types of input. For example, user A may input a gesture that the gesture component 210 determines is a tap gesture, whereas user B may input a similar gesture that the gesture component 210 determines is a press-and-hold gesture. Different users may have different touch inputs that the gesture component 210 may be configured to learn and use to differentiate between different intended gestures. In an embodiment, the gesture component 210 may be configured to implement a machine learning model to differentiate between different types of user gestures from a user and to predict user interest in different types of previews for the media content items based on a particular user gesture of the user.

In an embodiment, the gesture component 210 may use a machine learning model trained based on a training set reflecting different user actions with respect to search result items and associated media content items. The training may be performed by a training agent of the preview component 140 of the server 130 or by a training agent hosted by the user device 110.

The training agent may use previously inputted user gestures from the user and/or other users with respect to search results items as training inputs and user selections of corresponding media items for playback as target outputs to train the machine learning model. For instance, the training agent may associate with specific users, user input tendencies such as differentiating between user gestures based upon how long a user tends to hold a tap gesture or how quickly a user swipes their finger versus dragging their finger.

In other embodiments, the training agent may train the machine learning model to predict user preferences for desired types of preview videos based upon a training set including, but not limited to, different user gestures, previously viewed preview videos, associated content media item types, and subsequent user actions after the user is presented with a specific preview video. For example, if the user is presented with a preview video that is a trailer and the user historically continues scrolling through search result items before playback of the trailer is complete, then the training agent may include, in the training set, a negative response to trailer preview videos for that user.

Alternatively, the preview component 140 of server 130 may use the machine learning model to differentiate between different types of user gestures from different users and to predict user interest in different types of previews for the media content items based on a particular user gesture of a specific user, which may be communicated to the preview component 140 by the user device 110 of that user. Upon predicting user interest in a preview of a media content item corresponding to one of the search result items presented to the user, the preview component 140 may provide the preview of the media content item (e.g., a trailer, a clip or a complete video) to the user device.

In an embodiment, the display component 215 is configured to render content for user interfaces on the media viewer 111 including, but not limited to, the scrollable search result area with search result items and the focus area with the preview content. For example, if the gesture component 210 determines that the user selects a specific search result item for previewing, then the communication component 205 may request and subsequently receive a preview video for the media content item corresponding to the specific search result item. The display component 215 may then render the preview video for display within the focus area on the media viewer 111. The display component 215 may start playing the preview video automatically (upon receiving the preview video and without any user input to request the playback). In some embodiments, the display component 215 may render and simultaneously play two different preview videos within the focus area if the gesture component 210 determines that two search result items are located within the same focus area.

Figure 3:
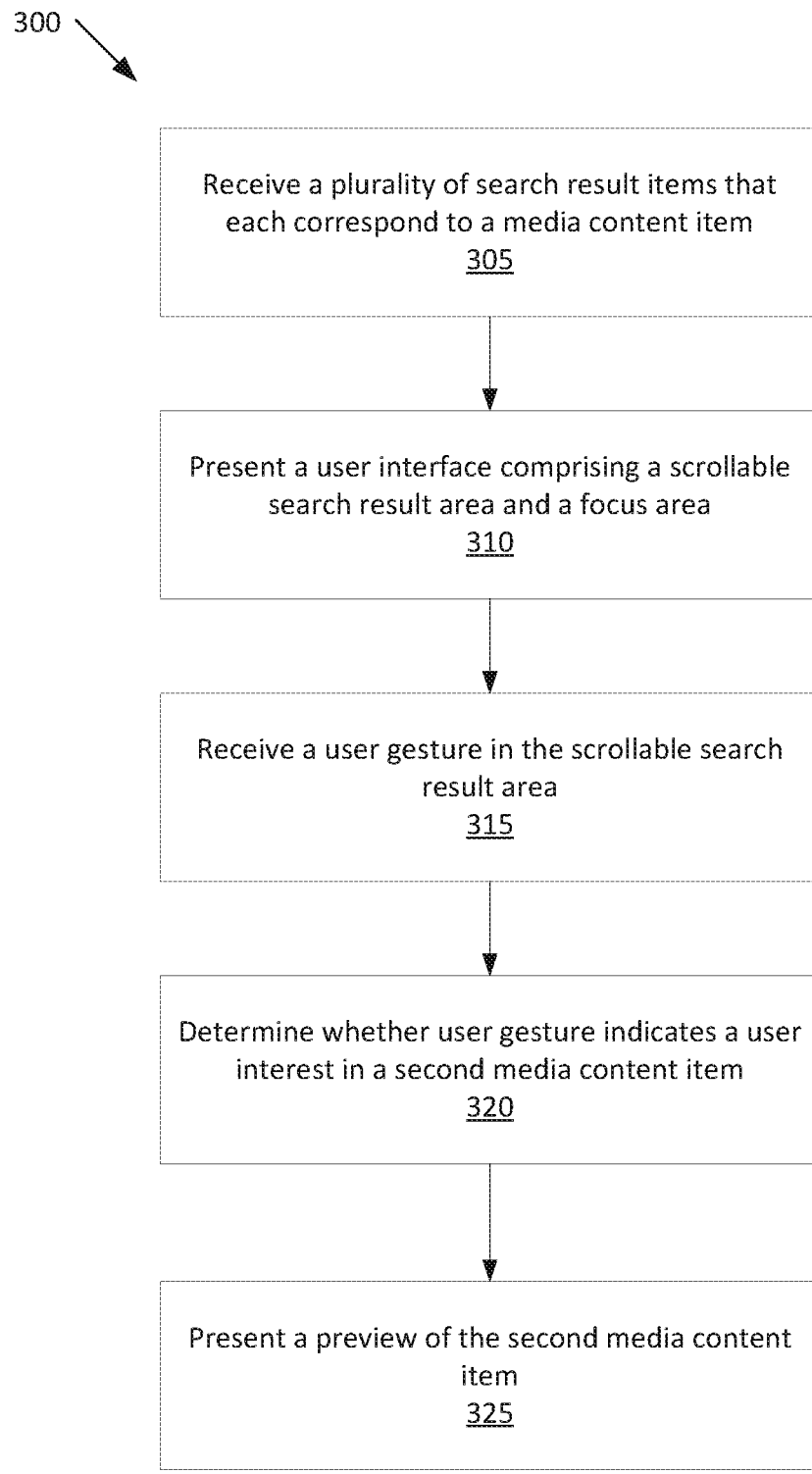
FIG. 3 is a flow diagram of an example method to receive a plurality of search result items and to present a preview of a media content item corresponding to a selected search result item, in accordance with some aspects of the disclosure.

FIG. 3 is a flow diagram of an example method to receive a plurality of search result items and to present a preview of a media content item corresponding to a selected search result item. In general, the method 300 may be performed by processing logic that may comprise hardware (e.g., processing device, circuitry, dedicated logic, programmable logic, microcode, etc.), software (e.g., instructions run on a processing device), or a combination thereof. In some embodiments, the method 300 may be performed by the components within the media viewer 111 of FIG. 1 or 2.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

As shown in FIG. 3, the method 300 may begin with processing logic receiving a plurality of search result items that each correspond to a media content item (block 305). In an embodiment, the search engine platform 150, in response to receiving a search query from the client device 110A may send the plurality of search result items to the client device 110A.

Figure 4B:
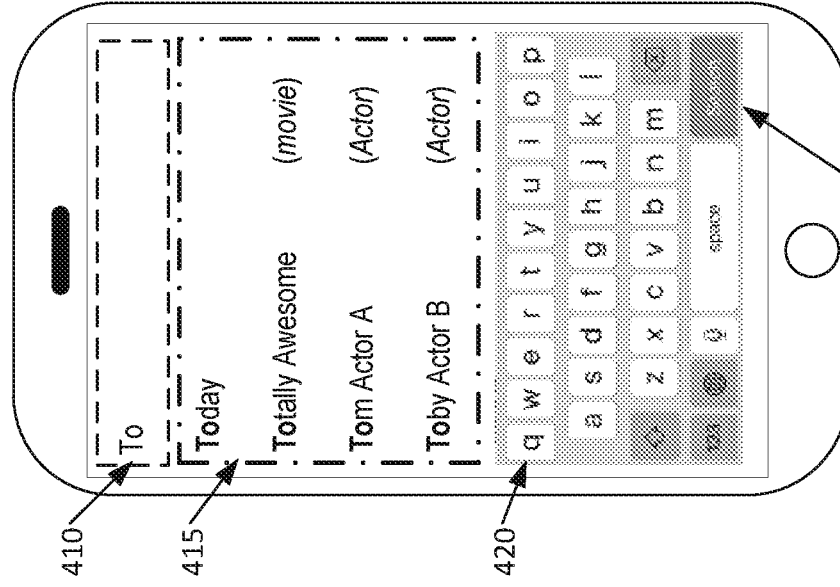
FIG. 4B illustrates an example graphical user interface of a partially inputted search query in accordance with some aspects of the present disclosure.
Figure 4A:
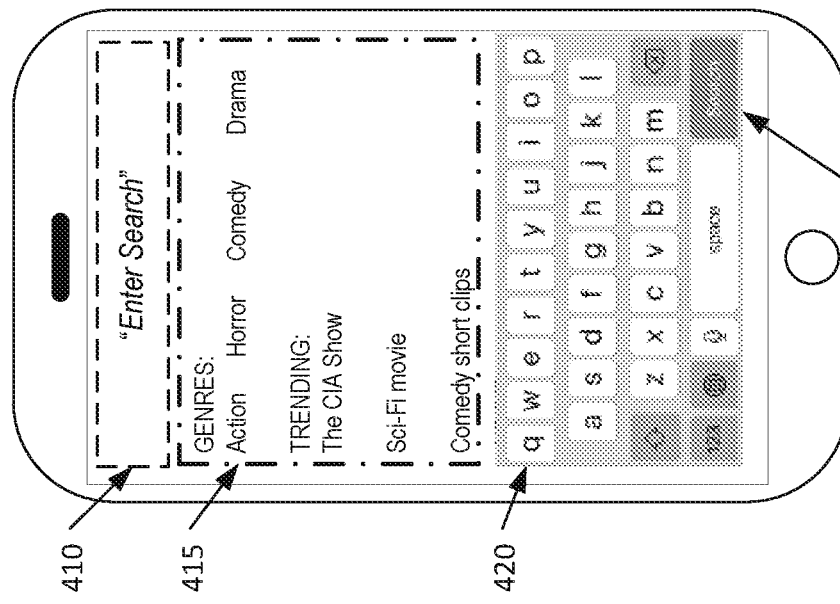
FIG. 4A illustrates an example graphical user interface to input a search query in accordance with some aspects of the present disclosure.

The search query may be generated from the media viewer 111 as a result of a user inputting a search into the media viewer 111. FIGS. 4A and 4B represent example embodiments of a user interface including a search input view 405 within the media viewer 111. Referring to FIG. 4A, the user may input text for a search query for related media content items in a search text box 410 using input keyboard 420. Alternatively, the search input view 405 may display one or more search suggestions in the suggestions area 415. In an embodiment, the one or more search suggestions in the suggestions area 415 may be suggestions based upon historical searches performed by the user or historical searches performed by other users using the search engine platform 150 and/or the content sharing platform 120. For example, upon initiating the search input view 405, the communication component 205 may request from the search engine platform 150 a set of one or more search suggestions based upon historical searches. In FIG. 4A, the suggestions area 415 depicts an example of received search suggestions from the search engine platform 150 and available genres that the user may select for narrowing a search.

FIG. 4B illustrates an embodiment of receiving updated search suggestions based upon partially inputted text in the search text box 410. In an embodiment, as characters are entered into the search text box 410, the communication component 205 may request from the search engine platform 150 a set of one or more search suggestions based upon the characters entered into the search text box 410. For example, if the characters "To" are entered into the search text box 410, the communication component 205 may request one or more search suggestions that begin with "To" from the search engine platform 150. In FIG. 4B, the suggestions area 415 depicts an example of suggestions received from the search engine platform 150 based upon the partially inputted text "To."

Upon inputting text in the search text box 410 and initiating the search by selecting search button 425, the communication component 205 may send a search query that includes the inputted text to the search engine platform 150. The search engine platform 150 may send a plurality of search result items to the client device 110A. Referring back to block 305, the communication component 205 of the client device 110A receives the plurality of search result items that each correspond to a media content item.

In one implementation, each of the plurality of search result items received may include metadata describing their corresponding media content item. For example, a search result item corresponding to a media content item for Movie XYZ may include metadata specifying the title of Movie XYZ, actors and actresses who star in the movie, the release date of the movie, descriptive text that provides a summary of the movie, the movie genre, representative thumbnails of the movie, and/or any other descriptive or related metadata.

Upon receiving the plurality of search result items, the processing logic presents a search results user interface (UI) that includes a scrollable search result area and a focus area (block 310). FIG. 4C illustrates an example embodiment of a search results UI including the search text box 410, a focus area 430, and a scrollable search result area 435. Other embodiments of the search results UI may include displaying the focus area 430 and the scrollable search result area 435 without the search text box 410. Yet other embodiments may also include the display of the input keyboard 420 that may allow a user to input search text when updating the search request. Embodiments of the search results UI may include displaying the search text box 410, the focus area 430, the scrollable search result area 435, and/or the input keyboard 420 in different locations within the user interface.

In one implementation, the display component 215 renders the search result UI to include the search text box 410, the focus area 430, and the scrollable search result area 435, as illustrated in FIG. 4C. The search text box 410 may display the input search text used for the current search query. For example, if the input search text for the current search query is "Actor A," then the search text box 410 would display in the input search text "Actor A."

In one implementation, the scrollable search result area 435 may display a subset of the plurality of search result items received from the search engine platform 150. The plurality of search result items received from the search engine platform 150 may be ordered in terms of relevance to the search request, where the first search result item is the most relevant search result item. Alternatively, the plurality of search result items may be ordered by other criteria such as, popularity based upon other users of the content sharing platform 120, release date, publish date, or type of content media item. For instance, content media items that are live videos, previously uploaded videos, or released motion pictures may be prioritized within the search result item order. Additionally, the plurality of search result items may be ordered based upon the requesting user's viewing preferences. For example, if the user prefers videos from subscribed channels, then the plurality of search result items may be ordered such that the videos from subscribed channels are first.

In an embodiment, the processing device of the client device 110A may be configured to prioritize the order of the search result items based upon local user preferences stored on the client device 110A.

FIG. 4C depicts an example embodiment of four search result items 441-444. The display component 215 may configure the display height of each of the search result items 441-444 to be either narrower or wider depending upon the metadata displayed for each search result item. For example, search result item 441 contains metadata describing the title of the corresponding media content item (Movie ABC) and the release date (1986). The display component 215 may configure a taller height for search result item 441 if additional metadata, such as summary text, is displayed. Alternatively, the display component may configure a lower height if minimal metadata is displayed. Lower heights for search result items 441-444 may allow for additional search result items from the plurality of search result items to be displayed within the scrollable search result area 435.

In an embodiment, the display component 215 may be configured to display the focus area 430 with a configured height relative to the size of the display for the client device 110A. For example, the display component 215 may configure a larger focus area 430 for client devices 110A-110Z that are smartphone or other devices that have smaller display screens. Whereas clients devices 110A-110Z that have larger screens may have a configured focus area 430 that occupies less relative space compared to the scrollable search result area 435, thereby allowing a larger scrollable search result area 435 for display of additional search result items.

In an embodiment, the display component 215 may be configured to present a preview of a media content item corresponding to a specific search result item within the focus area 430. For example referring to FIG. 4C, the received plurality of search result items are search results corresponding to media content items related to a search for "Actor A." The display component 215 may render a preview video of the media content item that corresponds to the first search result item from the received plurality of search result items. In the example depicted in FIG. 4C, the rendered preview in the focus area 430 is a preview video of the movie XYZ starring Actor A.

In an embodiment, the processing logic may send a preview request for the media content item corresponding to the specific search result item to the preview component 140. FIG. 5 depicts an example flowchart for sending a preview request and receiving a preview of the media content item for presentation within the focus area 430. Block 505 illustrates the communication component 205 sending the preview request for a preview corresponding to the media content item to the preview component 140. In an embodiment, a specific search result item corresponding to a media content item may be selected to be previewed within the focus area. Using the example depicted in FIG. 4C, the specific search result item corresponds to the media content item for movie XYZ.

In an embodiment, the preview component 140 may receive the preview request and then determine an appropriate preview video to send back to the client device 110A. As described previously, the preview component 140 is configured to maintain associations between media content items and previews for the media content items. For example, the preview request received may contain a request for a preview related to the media content item movie XYZ. The preview component 140 may maintain one or more related preview videos for the media content item movie XYZ. For instance, preview videos for movie XYZ may include other media content items such as a trailer of the movie, selected video clips of the movie, related summary videos of the movie, the actual video of movie XYZ, or any other associated video related to movie XYZ.

In an embodiment, the preview video may be a lower resolution video with or without sound. For example, the associated preview videos for movie XYZ may include low-resolution videos such as, 15-frame per second videos that are without sound. The low-resolution videos may be beneficial in conserving bandwidth when transferring preview videos between the preview component 140 and the client device 110A. Transferring smaller video sizes, such as low-resolution videos, may increase network efficiency when requesting and receiving multiple preview videos over the network 105 and may reduce video play lag as rendering smaller sized videos use less processing resources and time.

In an embodiment, the preview request may specify the type of preview video requested. For example, the processing device may determine based upon the user's historical viewing preferences of previews that the user prefers video trailers over video snippets for media content items. In another example, the type of preview video requested may be based upon the media content item itself. For instance, if the media content item is a short video, then the preview request sent may include a request for the actual video of the media content item because the media content item is a short video as opposed to a longer movie. In an embodiment, the preview component 140 may be configured to determine the type of preview video to send based upon user preference stored within the content sharing platform 120 or within client devices 110A-110Z. For example, the preview component 140, upon receiving a preview request, may communicate with the content sharing platform 120 to determine which type of previews the user prefers based on the stored user profile and viewing history.

Referring back to FIG. 5, block 510 depicts receiving by the communication component 205, the preview video from the preview component 140. In an embodiment, the preview component 140 sends, via the network 105, a preview video of the media content item corresponding to the search result item. At block 515, the display component 215 renders and presents the preview video of the media content item within the focus area 430. For example, if the preview video received is a trailer of the movie XYZ then the display component 215 renders and presents the trailer within the focus area 430.

In an embodiment, upon receiving the plurality of search result items (block 305), the display component 215 may initially present a thumbnail for the first search result item within the focus area 430. Metadata for the first search result item may include thumbnails or other related artwork for the corresponding media content item that may be displayed within the focus area 430. After displaying the thumbnail for the first search result item, the communication component 205 may then request the preview for the media content item corresponding to the first search result item, as described in FIG. 5.

In an alternative embodiment, a preview video for the media content item corresponding to the first search result item (the search result item with the highest ranking) may be sent to the client device 110A when the plurality of search result items is sent to the client device 110A from the search engine platform 150. For example referring back to block 305, when the communication component 205 receives the plurality of search result items from the search engine platform 150, the search engine platform 150 may also initially retrieve a preview video of the media content item corresponding to the first search result item from the preview component 140. Then the search engine platform 150 sends the plurality of search result items and the preview video related to the first search result item to the communication component 205. The display component 215 may then render and present the preview video within the focus area 430 and render and display the subset of search result items in the scrollable search result area 435.

Referring back to FIG. 3, the processing logic may receive a user gesture within the scrollable search result area 435 on the touchscreen of the client device 110A (block 315). In an embodiment, the user gesture may be input from a user's finger or other instrument, such as a stylus, onto a touchscreen surface of the client device 110A. User gestures may include, but are not limited to, a tap gesture, a press-and-hold gesture, a drag gesture, a swipe gesture, or any other trackable touch gesture. A tap gesture may refer to a user initiating contact with the touchscreen surface, such as by touching or pressing the surface with a finger or other input item at a particular location on the touchscreen surface. Once contact has been made, the gesture component 210 determines the coordinates of the input relative to the current user interface.

A press-and-hold gesture may refer to user input that is a continuous input over a duration of time. For instance, a user may initiate contact with a touchscreen surface, such as by touching or pressing the surface with a finger or other input item at a particular location, and maintain such contact over a period of time (e.g., 0.25, 0.5, 1.0, 1.5 seconds). Once the contact has been held for a predefined period of time, the gesture component 210 determines the coordinates of the press-and-hold input relative to the current user interface.

A drag gesture may refer to user input an act or instance of moving a finger or other input item that is in contact with the touchscreen across the touchscreen to activate a function, where a speed of the movement of the input is below a threshold value. A swipe gesture may refer to user input an act or instance of moving a finger or other input item that is in contact with the touchscreen across the touchscreen to activate a function, where a speed of the movement of the input is above a threshold value. Once contact has been made and the act of moving the input while maintaining contact with the touchscreen occurs, the gesture component 210 determines the start and end point coordinates of the input and the speed of movement of the input to determine whether the input is a drag, a swipe, or other type of gesture based upon the threshold value for speed of movement.

At block 320, the processing logic determines whether the received user gesture indicates a user interest in a second media content item. In an embodiment, the gesture component 210 determines whether the received user gesture is a user gesture indicating an interest in a specific search result item, which causes the specific search result item to move into the focus area 430. For example referring to FIG. 4D, the received user gesture 450 is a tap gesture. The gesture component 210 may then determine that user gesture 450 indicates a user interest in search result item 443, which is located at the coordinates of user gesture 450 input. The gesture component 210 may then cause the search result items 441-444 to shift upwards such that search result item 443 is located in the focus area 430 and search result item 444 is located at a location, within the scrollable search result area 435, directly below the focus area 430. In an embodiment, when the search result items 441-444 shift upwards, the display component 215 may determine a new subset of search result items from the plurality of search result items and render and display an updated search results UI with search result items 444-447 within the scrollable search result area 435, as depicted in FIG. 4E.

In another example, the received user gesture may be a drag gesture or a swipe gesture. Referring to FIG. 4D the gesture component 210 may determine whether user gesture 455 is a drag gesture or a swipe gesture based upon the speed of movement of the input item and the user associated with the input gesture. In an embodiment, the gesture component 210 may determine that the user gesture 455 is a swipe gesture based upon the speed of movement of the user input and the threshold value for the user associated with the gesture input. For example, the gesture component 210 may, based upon machine learning or other criteria, determine the specific threshold value for speed of movement for the current user. This determined threshold value may be based upon past user inputs and past determination between drags and swipes for the user. In an embodiment, configuring user-specific threshold values enables the gesture component 210 to be more accurate when determining subsequent user inputs. If the gesture component 210 determines that user gesture 455 is a swipe, then the gesture component may shift search result items 441-444 at a speed corresponding to the speed of user gesture 455. Additionally, the gesture component 210 may determine based upon the starting position and the speed of movement of user gesture 455 that search result item 444 is the search result item the user is interested in previewing.

Alternatively, the gesture component 210 may determine that the user gesture 455 is a drag gesture based upon the speed of movement of the user input being below the threshold value for the user associated with the gesture input. In an embodiment, the gesture component 210 may then determine that the user is interested in viewing a preview of each search result item that overlaps the focus area 430 while the drag gesture is occurring. For example, the user may slowly drag search result item 444 upwards, thereby causing each of the search result items 441-444 to slowly overlap with the focus area 430 so that a preview for each corresponding media content item may be viewed while the drag gesture occurs. In this example, the gesture component 210 may determine user interest based upon the drag gesture speed and the overlapping position of search result items while user gesture 455 occurs.

In an implementation, the gesture component 210 may determine that the user gesture 450 is a press-and-hold gesture based upon the continuous input over a duration of time. The gesture component 210 may then determine that the user intends to save the media content item selected by the press-and-hold gesture. Referring to FIG. 4D as an example, if the user gesture 450 is a press-and-hold gesture on search result item 443, then the gesture component 210 may determine that the user would like to download the media content item ("Movie DEF") associated with search result item 443. In an implementation, the communication component 205 may request to download the selected media content item and save the selected media content item to user device 110A. In another implementation, the communication component 205 may request to save the selected media content item to a cloud storage or other remote storage location that is associated with the user. Additionally, if the selected media content item represents a "live stream," then the communication component 205 may request to record and save the "live stream" of the media content item to either the to the user device 110A or a remote storage location.

Referring back to FIG. 3, as a result of determining that the user gesture indicates user interest in a second media content item, the processing logic presents a preview of the second media content item (block 325). In an embodiment, the processing device may perform the acts depicted in flowchart FIG. 5 for sending a preview request for a preview of the second media content item and receiving the preview of the second media content item for presentation within the focus area 430. For instance, at block 505 the communication component 205 may send a preview request for a preview of the second media content item (e.g., movie DEF), which corresponds to search result item 443.

In an embodiment, the type of preview requested in the preview request may be based upon the type of user gesture determined by the gesture component 210. For example, the gesture component 210 may be configured to differentiate different types of preview requests for a specific content media item based upon whether the user gesture 450 is a tap gesture or a press-and-hold gesture. If user gesture 450 is determined to be a tap gesture then the preview request may request the default preview video associated with the specific media content item for the search result item, such as a trailer or other video. However, if the user gesture 450 determined to be a press-and-hold gesture then the preview request may request a specific type of preview video, such as a snippet of the media content item or the actual media content item itself. Embodiments, of determining the type of preview requested in the preview request may be configured based upon specific user preferences defined by the user or may be derived from machine learning techniques based upon the user's historical viewing tendencies.

At block 510, the communication component 205 may receive the preview video for the second media content item from the preview component 140. At block 515, the display component 215 may render and display the preview video of the second media content item within the focus area 430. FIG. 4E depicts an example view of the display component 215 rendering and displaying the second media content item in the focus area 430, where the second media content item corresponds to a preview video of the movie DEF starring Actor A.

Referring back to the example of receiving user gesture 455, if user gesture 455 is determined to be a drag gesture, then each search result item that overlaps with the focus area 430 during the drag may be determined to be the search result item of interest. The display component 215 may then render and display the preview video for each media content item while the drag gesture occurs.

Referring to FIG. 4F, as search result item 441 shifts into the focus area 430, the preview video associated with search result item 441 is played. If only part of search result item 441 overlaps with the focus area 430, then the corresponding amount of the preview video for search result item 441 will be displayed and played within the focus area. In an embodiment, the display component 215 may determine the percentage of the rendered preview to display within the focus area 430 based upon the amount of a particular search result item overlapping the focus area 430. For example as search result item 441 shifts into the focus area 430 the percentage of the preview video, corresponding to the content media item associated with search result item 441, is displayed in the focus area 430. The percentage displayed corresponds to the percentage of search result item 441 that overlaps with the focus area 430. For example, in FIG. 4F 50% of search result item 441, corresponding to the content media item for "Movie ABC" is displayed within the bottom 50% of the focus area 430. The top 50% of the focus area 430 continues to display the preview video for content media item related to Movie XYZ. In another example, if only the top 5% of a search result item overlaps with the focus area 430, then the display component 215 will display only the top 5% of the corresponding preview video within the bottom 5% of the focus area 430, while the top 95% of the focus area 430 will still display the bottom 95% of the previous preview video. Concurrent presentation of both preview videos for movies XYZ and ABC enables a seamless playing of preview videos for the user.

Referring back to the example of receiving user gesture 455, if user gesture 455 is determined to be a swipe gesture then the display component 215 may only render and display preview videos for media content items determined to be of interest to the user. For example, user gesture 455 starts on search result item 444. While search result item 444 shifts upwards towards the focus area 430, search result items 441-443 overlap and pass through the focus area 430. Since search result items 441-443 are determined not to be of user interest, preview videos are not rendered and displayed by the display component 215. In an embodiment, the display component 215 may display related metadata, such as a thumbnail or related artwork within the focus area 430 while search result items 441-443 pass through the focus area 430.

In an embodiment, the display component 215 may be configured to overlay onto a preview video of a content media item, descriptive text related to the content media item. For example, if the preview video for movie ABC is playing within the focus area 430, then the display component 215 may overlay descriptive text from metadata in the corresponding search result item over the preview video. The result is that the user may view a summary of the content media item while viewing a preview of the content media item.

Figure 4G:
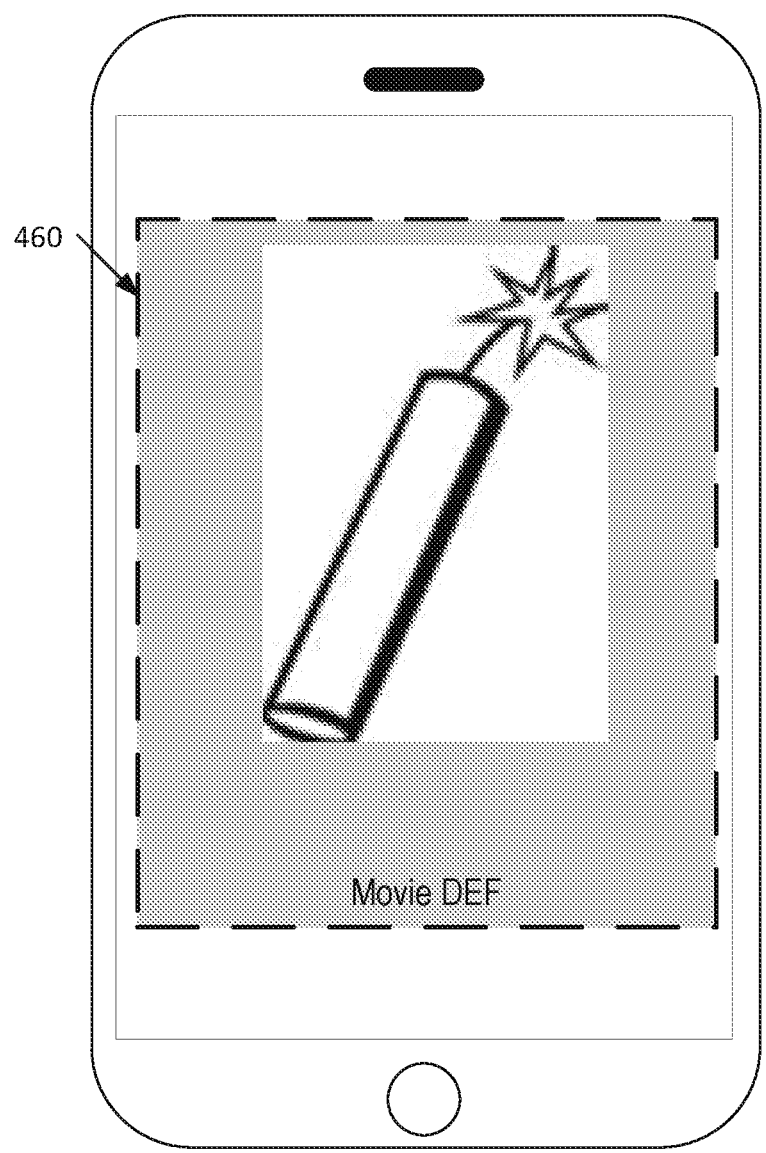
FIG. 4G illustrates an example graphical user interface providing a media content item playback view in accordance with some aspects of the present disclosure.

Referring to FIG. 4E, the gesture component 210 may detect user gesture 460 within the focus area 430. In an embodiment, if the gesture component 210 detects user input, such as user gesture 460, within the focus area 430, then the gesture component 210 may determine that the user intends to view the corresponding media item that is being previewed. The user gesture 460 may then cause the communication component 205 to request the corresponding media content item for playback. FIG. 4G depicts an embodiment of a playback user interface where the corresponding media content item is rendered and played by the display component 215 for the user to view. Playback view 465 illustrates an embodiment of a playback user interface. In other embodiments the playback user interface may be configured different depending on the client device 110A and other user preferences. In yet other embodiments, playback may be initiated within another application or may be streamed to a second client device such as a smart television or monitor.

Figure 6:
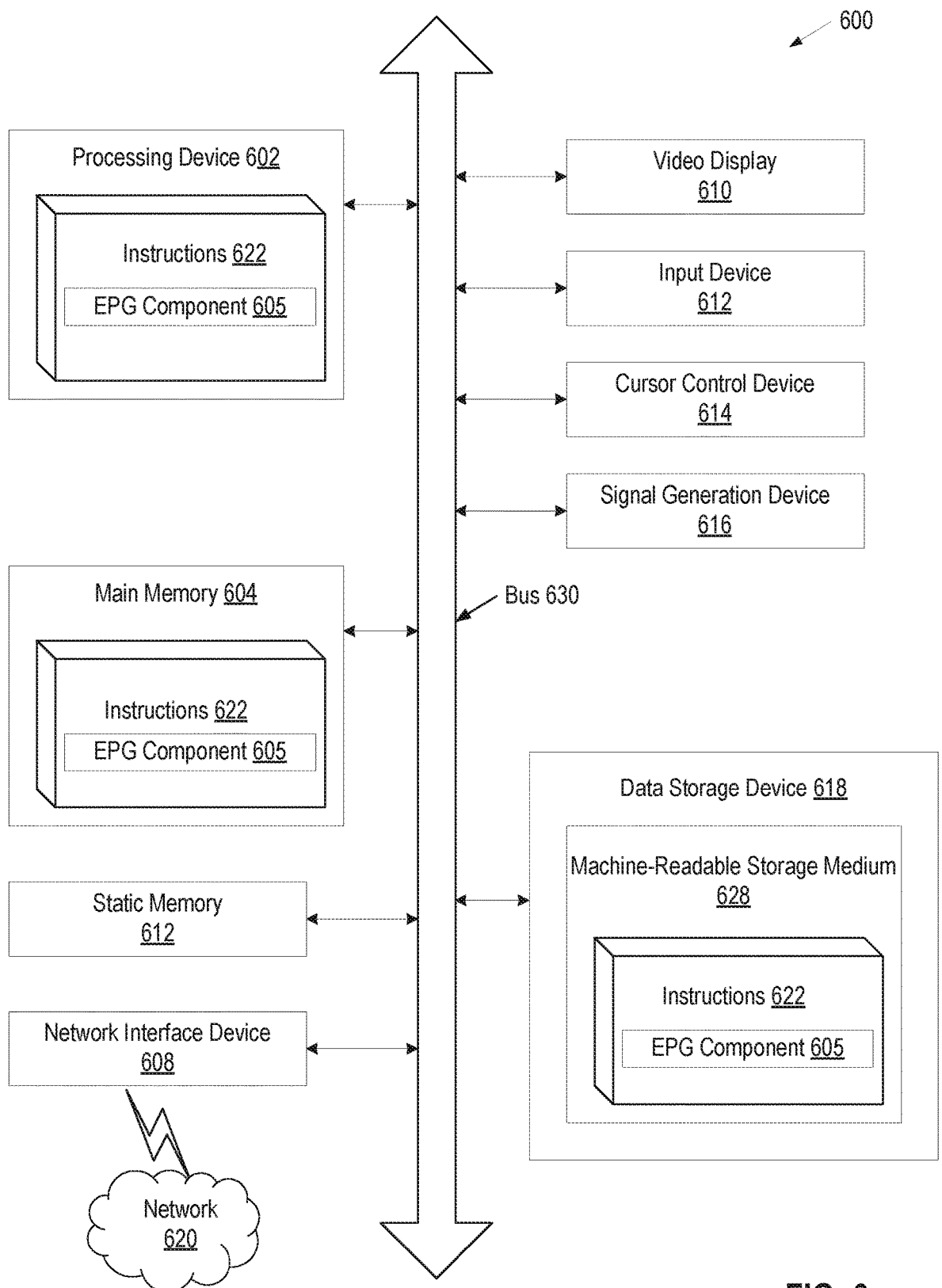
FIG. 6 illustrates a block diagram of an embodiment of a computer system in which some embodiments of the disclosure may operate.

FIG. 6 illustrates an example machine of a computer system 600 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 600 includes a processing device 602, a main memory 604 (e.g., read-only memory (ROM), flash memory, dynamic random access memory (DRAM) such as synchronous DRAM (SDRAM) or DRAM, etc.), a static memory 606 (e.g., flash memory, static random access memory (SRAM), etc.), and a data storage device 618, which communicate with each other via a bus 630.

Processing device 602 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 622 for performing the operations and steps discussed herein.

The computer system 600 may further include a network interface device 608. The computer system 600 also may include a video display unit 610 (e.g., a liquid crystal display (LCD) or a cathode ray tube (CRT)), an alphanumeric input device 612 (e.g., a keyboard), a cursor control device 614 (e.g., a mouse), and a signal generation device 616 (e.g., a speaker).

The data storage device 618 may include a machine-readable storage medium 628 (also known as a computer-readable medium) on which is stored one or more sets of instructions or software 622 embodying any one or more of the methodologies or functions described herein. The instructions 622 may also reside, completely or at least partially, within the main memory 604 and/or within the processing device 602 during execution thereof by the computer system 600, the main memory 604 and the processing device 602 also constituting machine-readable storage media.

In one implementation, the instructions 622 include instructions for a preview component (e.g., preview component 140 of FIG. 1) and/or a software library containing methods that provide functionality in a preview component. While the machine-readable storage medium 628 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct a more specialized apparatus to perform the method. The structure for a variety of these systems will appear as set forth in the description below. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense. A feature described in connection with one aspect or embodiment of the present disclosure may be used in any other aspect or embodiment of the present disclosure.

What is claimed is:

1. A computer-implemented method comprising:
receiving, at a client device, a plurality of search result items that each correspond to a media content item;
presenting a user interface comprising a scrollable search result area to present two or more of the plurality of search result items, and a focus area to present a preview of a media content item corresponding to one of the plurality of search result items, wherein the scrollable search result area and the focus area are concurrently presented on a screen of the client device;
receiving, while concurrently presenting the scrollable search result area and the focus area on the screen of the client device, one or more user touch inputs in the scrollable search result area, wherein the one or more user touch inputs comprise a user swipe gesture to scroll vertically to a second search result item of the plurality of search result items, wherein the user swipe gesture causes the two or more of the plurality of search result items to shift vertically upwards;
upon receiving the one or more user touch inputs to scroll vertically to the second search result item, determining, based on previously received user gestures associated with a user, whether the one or more user touch inputs indicate a user selection of the second search result item of the plurality of search result items; and
in response to determining that the one or more user touch inputs indicate the user selection of the second search result, presenting a preview of a second media content item corresponding to the second search result item in the focus area while concurrently presenting the scrollable search result area including the second search result on the screen of the client device.

2. The method of claim 1, wherein the one or more user touch inputs comprise a tap on the second search result item.

3. The method of claim 1, wherein presenting the preview of the second media content item corresponding to the second search result item comprises:
sending a request for the second media content item corresponding to the second search result item;
receiving the second media content item corresponding to the second search result item; and
presenting the second media content item corresponding to the second search result item in the focus area.

4. The method of claim 1, wherein the second media content item is a video trailer describing a video represented by the second media content item, a video clip comprising a subsection of the video, or the video.

5. The method of claim 1, wherein a type of the second media content item being presented is based upon previously presented media content items and/or user interactions with the previously presented media content items.

6. The method of claim 1, wherein prior to presenting the second media content item corresponding to the second search result item, presenting a thumbnail associated with the second media content item corresponding to the second search result item in the focus area.

7. The method of claim 1, wherein each search result item of the plurality of search result items comprises metadata describing a corresponding media content item.

8. The method of claim 7, wherein presenting the preview of the second media content item corresponding to the second search result item comprises:
overlaying the preview of the second media content item in the focus area with the metadata describing the second media content item.

9. The method of claim 1, wherein determining whether the one or more user touch inputs indicate the user selection of the second search result item of the plurality of search result items is based on at least one of a speed of movement associated with the one or more user touch inputs or a duration of time the one or more user touch inputs have continued.

10. A non-transitory machine-readable storage medium storing instructions which, when executed, cause a processing device to perform operations comprising:
receiving, at a client device, a plurality of search result items that each correspond to a media content item;
presenting a user interface comprising a scrollable search result area to present two or more of the plurality of search result items, and a focus area to present a preview of a media content item corresponding to one of the plurality of search result items, wherein the scrollable search result area and the focus area are concurrently presented on a screen of the client device;
receiving, while concurrently presenting the scrollable search result area and the focus area on the screen of the client device, one or more user touch inputs in the scrollable search result area, wherein the one or more user touch inputs comprise a user swipe gesture to scroll vertically to a second search result item of the plurality of search result items, wherein the user swipe gesture received in the scrollable search result area presented concurrently with the focus area including the preview of the media content item causes the two or more of the plurality of search result items to shift vertically upwards;

upon receiving the one or more user touch inputs to scroll vertically to the second search result item, determining, based on previously received user gestures associated with a user, whether the one or more user touch inputs indicate a user selection of the second search result item of the plurality of search result items; and in response to determining that the one or more user touch inputs indicate the user selection of the second search result, presenting a preview of a second media content item corresponding to the second search result item in the focus area while concurrently presenting the scrollable search result area including the second search result on the screen of the client device.

11. The non-transitory machine-readable storage medium of claim 10, wherein the one or more user touch inputs comprise a tap on the second search result item.

12. The non-transitory machine-readable storage medium of claim 10, wherein presenting the preview of the second media content item corresponding to the second search result item comprises:

sending a request for the second media content item corresponding to the second search result item;

receiving the second media content item corresponding to the second search result item; and presenting the second media content item corresponding to the second search result item in the focus area.

13. The non-transitory machine-readable storage medium of claim 10, wherein presenting the preview of the second media content item corresponding to the second search result item comprises:

overlaying the preview of the second media content item in the focus area with metadata describing the second media content item.

14. The non-transitory machine-readable storage medium of claim 10, wherein determining whether the one or more user touch inputs indicate the user selection of the second search result item of the plurality of search result items is based on at least one of a speed of movement associated with the one or more user touch inputs or a duration of time the one or more user touch inputs have continued.

15. A system comprising:
a memory; and
a processing device operatively coupled with the memory to:

receive a plurality of search result items that each correspond to a media content item;

present a user interface comprising a scrollable search result area to present two or more of the plurality of search result items, and a focus area to present a preview of a media content item corresponding to one of the plurality of search result items, wherein the scrollable search result area and the focus area are concurrently presented on a screen of a client device;

receive, while concurrently presenting the scrollable search result area and the focus area on the screen of the client device, one or more user touch inputs in the scrollable search result area, wherein the one or more user touch inputs comprise a user swipe gesture to scroll vertically to a second search result item of the plurality of search result items, wherein the user swipe gesture causes the two or more of the plurality of search result items to shift vertically upwards;

upon receiving the one or more user touch inputs to scroll vertically to the second search result item, determine, based on previously received user gestures associated with a user, whether the one or more user touch inputs indicate a user selection of the second search result item of the plurality of search result items; and in response to determining that the one or more user touch inputs indicate the user selection of the second search result, present a preview of a second media content item corresponding to the second search result item in the focus area while concurrently presenting the scrollable search result area including the second search result on the screen of the client device.

16. The system of claim 15, wherein the one or more user touch inputs comprise a tap on the second search result item.

17. The system of claim 15, wherein the processing device is to determine whether the one or more user touch inputs indicate the user selection of the second search result item of the plurality of search result items based on at least one of a speed of movement associated with the one or more user touch inputs or a duration of time the one or more user touch inputs have continued.

\* \* \* \* \*